(12) United States Patent
Ryu et al.

(10) Patent No.: US 9,529,118 B2
(45) Date of Patent: Dec. 27, 2016

(54) COMPOSITION FOR OPTICAL MATERIAL AND USE OF SAME

(71) Applicant: Mitsui Chemicals, Inc., Minato-ku, Tokyo (JP)

(72) Inventors: Akinori Ryu, Arao (JP); Ryouichi Seki, Sodegaura (JP); Kazuki Fujii, Yokohama (JP)

(73) Assignee: MITSUI CHEMICALS, INC., Tokyo (JP)

( * ) Notice: Subject to any disclaimer, the term of this patent is extended or adjusted under 35 U.S.C. 154(b) by 36 days.

(21) Appl. No.: 14/647,845

(22) PCT Filed: Nov. 29, 2013

(86) PCT No.: PCT/JP2013/082153
§ 371 (c)(1),
(2) Date: May 28, 2015

(87) PCT Pub. No.: WO2014/084339
PCT Pub. Date: Jun. 5, 2014

(65) Prior Publication Data
US 2015/0301227 A1    Oct. 22, 2015

(30) Foreign Application Priority Data
Nov. 30, 2012    (JP) ................. 2012-261889

(51) Int. Cl.
| | |
|---|---|
| *G02C 3/00* | (2006.01) |
| *G02C 7/02* | (2006.01) |
| *G02C 7/10* | (2006.01) |
| *G02B 1/04* | (2006.01) |
| *C09K 9/02* | (2006.01) |
| *C08K 5/1545* | (2006.01) |
| *C08L 23/02* | (2006.01) |
| *G02B 5/30* | (2006.01) |
| *G02C 7/12* | (2006.01) |

(52) U.S. Cl.
CPC ............ *G02B 1/041* (2013.01); *C08K 5/1545* (2013.01); *C08L 23/02* (2013.01); *C09K 9/02* (2013.01); *G02B 5/30* (2013.01); *G02C 7/10* (2013.01); *G02C 7/102* (2013.01); *G02C 7/12* (2013.01); *C09K 2211/1007* (2013.01); *C09K 2211/1011* (2013.01); *C09K 2211/1088* (2013.01)

(58) Field of Classification Search
CPC ......... G02B 1/041; G02B 5/30; G02B 5/3008; G02C 7/102; G02F 1/13362; G02F 2202/40; D10B 2321/02; Y10T 442/169
USPC ......... 252/586; 349/62; 351/62; 359/241–44
See application file for complete search history.

(56) References Cited

U.S. PATENT DOCUMENTS

| | | |
|---|---|---|
| 2002/0197562 A1 | 12/2002 | Breyne et al. |
| 2003/0030040 A1 | 2/2003 | Luthern et al. |
| 2012/0268828 A1 | 10/2012 | Chen |

FOREIGN PATENT DOCUMENTS

| | | |
|---|---|---|
| CN | 1315948 A | 10/2001 |
| EP | 2275418 A1 | 1/2011 |
| GB | 1394056 A | 5/1975 |
| JP | 05-034649 A | 2/1993 |
| JP | 06-299019 A | 10/1994 |
| JP | 07-178831 A | 7/1995 |
| JP | 10-026702 A | 1/1998 |
| JP | 2004-339184 A | 12/2004 |
| JP | 2005-215640 A | 8/2005 |
| JP | 2010-263407 A | 11/2010 |
| JP | 2011-144181 A | 7/2011 |
| JP | 2012-520383 A | 9/2012 |
| JP | 2012-226026 A | 11/2012 |
| WO | WO 00/15628 | 3/2000 |

OTHER PUBLICATIONS

Office Action issued by the Chinese Patent Office in corresponding Chinese Patent Application No. 201380062696.4 (6 pages).
Extended Search Report issued by the European Patent Office in corresponding European Patent Application No. 13857787.9 on Jun. 16, 2016 (7 pages).
International Search Report (PCT/ISA/210) mailed on Dec. 24, 2013, by the Japanese Patent Office as the International Searching Authority for International Application No. PCT/JP2013/082153.

*Primary Examiner* — Mahidere Sahle
(74) *Attorney, Agent, or Firm* — Buchanan, Ingersoll & Rooney PC

(57) ABSTRACT

A composition for optical materials of the present invention includes a polyolefin (A) obtained by (co)polymerizing at least one kind of olefin selected from α-olefins having 3 to 20 carbon atoms and a photochromic compound (B).

9 Claims, No Drawings

COMPOSITION FOR OPTICAL MATERIAL AND USE OF SAME

TECHNICAL FIELD

The present invention relates to a composition for optical materials and use of the same.

BACKGROUND ART

Since a plastic lens is light and not easily cracked compared to inorganic lenses, plastic lenses have been become widely distributed as optical elements such as an eyeglass lens, a camera lens, and the like. In recent years, development of a plastic lens having a photochromic performance has proceeded.

As the plastic lens having a photochromic performance, there are (1) a plastic lens in which a photochromic compound is included in a plastic lens substrate and (2) a plastic lens comprised of a layer including a photochromic compound and a plastic lens substrate.

As the plastic lens of the above (1), a plastic lens described in Patent Document 1 or Patent Document 2 can be exemplified.

Patent Document 1 describes a plastic lens obtained by polymerizing a monomer mixture including a monomer component such as a methacrylic ester and a photochromic compound.

Patent Document 2 describes a photochromic plastic lens including a photochromic organic compound in the vicinity of the surface thereof. In the document, a photochromic plastic lens is manufactured by impregnating the vicinity of the surface of a plastic lens substrate with a photochromic organic compound.

As the plastic lens of the above (2), a plastic lens described in Patent Document 3 can be exemplified.

Patent Document 3 describes a polarizing lens obtained by forming a photochromic polymer layer by polymerizing a mixture containing of a compound having a radically polymerizable group and a photochromic compound on the surface of a transparent resin having a polarizing film. Furthermore, it is described that the transparent resin having a polarizing film consists of a polyolefin-based resin such as polymethyl pentene (paragraph 0070).

Patent Document 4 describes a photochromic lens obtained by embedding a laminate (A) in which a thermosetting polyurethane resin layer containing a photochromic compound is sandwiched between two transparent plastic lens materials of which the surfaces are provided with coating layers into a lens body comprised of a transparent thermosetting resin (B) or stacking the thermosetting resin (B) on the laminate (A). As the transparent plastic material, a noncrystalline polyolefin-based resin can be exemplified.

Moreover, Patent Document 5 discloses a plastic lens including a predetermined compound having photochromic characteristics.

RELATED DOCUMENT

Patent Document

[Patent Document 1] Japanese Unexamined Patent Publication No. 5-034649
[Patent Document 2] Japanese Unexamined Patent Publication No. 10-026702
[Patent Document 3] Japanese Unexamined Patent Publication No. 7-178831
[Patent Document 4] Japanese Unexamined Patent Publication No. 2005-215640
[Patent Document 5] Japanese Unexamined Patent Publication No. 2011-144181

DISCLOSURE OF THE INVENTION

However, the cited documents 1 to 3 do not disclose a lens substrate or a photochromic film laminated to a lens substrate which includes a polyolefin and a photochromic compound. In a case of use by combining a polyolefin and a photochromic compound, photochromic performance is not exhibited in some cases.

The present invention can be described as follows.

[1] A composition for optical materials comprising a polyolefin (A) obtained by (co) polymerizing at least one kind of olefin selected from α-olefins having 3 to 20 carbon atoms, and a photochromic compound (B).

[2] The composition for optical materials according to [1], in which the photochromic compound (B) is represented by the following general formula (1).

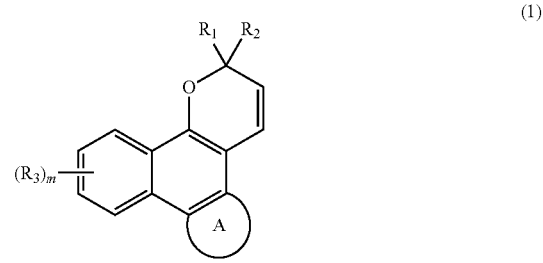

In the formula, $R_1$ and $R_2$ may be the same as or different from each other, and each of $R_1$ and $R_2$ independently represents a hydrogen atom;

a linear or branched alkyl group having 1 to 12 carbon atoms;

a cycloalkyl group having 3 to 12 carbon atoms;

an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, an —$NH_2$ group, an —NHR group, an —$N(R)_2$ group (R is a linear or branched alkyl group having 1 to 6 carbon atoms. In a case where two Rs are present, the two Rs may be the same as or different from each other.), and a methacryloyl group or an acryloyl group); or an aralkyl or heteroaralkyl group (a linear or branched alkyl group having 1 to 4 carbon atoms is substituted with the aryl group or the heteroaryl group.), $R_3$s may be the same as or different from each other, and each of $R_3$s independently represents a halogen atom;

a linear or branched alkyl group having 1 to 12 carbon atoms;

a cycloalkyl group having 3 to 12 carbon atoms;

a linear or branched alkoxy group having 1 to 12 carbon atoms;

a linear or branched haloalkyl group having 1 to 12 carbon atoms which is substituted with at least one halogen atom, a halocycloalkyl group having 3 to 12 carbon atoms which is substituted with at least one halogen atom, a linear or branched haloalkoxy group having 1 to 12 carbon atoms which is substituted with at least one halogen atom;

an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an amino group);

an aralkyl or heteroaralkyl group (a linear or branched alkyl group having 1 to 4 carbon atoms is substituted with the aryl group or the heteroaryl group.);

a substituted or unsubstituted phenoxy or naphthoxy group (which has at least one substituent selected from a linear or branched alkyl or alkoxy group having 1 to 6 carbon atoms);

—NH$_2$, —NHR, —CONH$_2$ or —CONHR (R is a linear or branched alkyl group having 1 to 6 carbon atoms); or —OCOR$_8$ or —COOR$_8$ (here, R$_8$ is a linear or branched alkyl group having 1 to 6 carbon atoms, a cycloalkyl group having 3 to 6 carbon atoms, or in R$_1$ and R$_2$, a phenyl group which is substituted with at least one substituent of a substituted aryl group or a substituted heteroaryl group or an unsubstituted phenyl group), m is an integer of 0 to 4;

(A$_2$)

—(R$_4$)n (A$_4$)

—(R$_4$)n (R$_5$)p

A of formula (1) represents an annelated ring of the above formula (A$_2$) or (A$_4$), and in these annelated rings, a dotted line represents a carbon C$_5$-carbon C$_6$ bond of the naphthopyran ring in the general formula (1);

an α bond of an annelated ring (A$_4$) can be normally bonded to the carbon C$_5$ or C$_6$ of the naphthopyran ring in the general formula (1);

R$_4$s may be the same as or different from each other, each of R$_4$s independently represents OH or a linear or branched alkyl group or alkoxy group having 1 to 6 carbon atoms, or two R$_4$s form a carbonyl (CO);

R$_5$ represents a halogen atom;

a linear or branched alkyl group having 1 to 12 carbon atoms;

a linear or branched haloalkyl group having 1 to 6 carbon atoms which is substituted with at least one halogen atom;

a cycloalkyl group having 3 to 12 carbon atoms; a linear or branched alkoxy group having 1 to 6 carbon atoms;

a substituted or unsubstituted phenyl or benzyl group (which has at least one of substituents described above in the definition of R$_1$ and R$_2$ groups as a substituent in a case where each of R$_1$ and R$_2$ groups in the general formula (1) independently corresponds to an aryl or heteroaryl group);

—NH$_2$ or —NHR (here, R is a linear or branched alkyl group having 1 to 6 carbon atoms);

a substituted or unsubstituted phenoxy or naphthoxy group (which has at least a linear or branched alkyl or alkoxy group having 1 to 6 carbon atoms as a substituent);

a —COR$_9$, —COOR$_9$, or —CONHR$_9$ group (here, R$_9$ is a linear or branched alkyl group having 1 to 6 carbon atoms, a cycloalkyl group having 3 to 6 carbon atoms, or a substituted or unsubstituted phenyl or benzyl group (which has at least one of substituents described above in the definition of R$_1$ and R$_2$ groups as a substituent in a case where each of R$_1$ and R$_2$ groups in the general formula (1) independently corresponds to an aryl or heteroaryl group.));

in a case where A exhibits (A$_4$), n is an integer of 0 to 2, p is an integer of 0 to 4, and in a case where A exhibits (A$_2$), n is an integer of 0 to 2).

[3] The composition for optical materials according to [1] or [2], in which in the polyolefin (A), the content of unit derived from at least one kind of olefin selected from branched α-olefins having 5 to 20 carbon atoms is 50 mol % to 100 mol %.

[4] The composition for optical materials according to any one of [1] to [3], in which the polyolefin (A) is a 4-methyl-1-pentene-based polymer.

[5] An optical material comprised of the composition according to any one of [1] to [4].

[6] A plastic eyeglass lens having a substrate comprised of the composition according to any one of [1] to [4].

[7] A film comprised of the composition according to any one of [1] to [4].

[8] A plastic eyeglass lens having a layer comprised of the film according to [7] over at least one surface of lens substrate surfaces.

[9] A plastic eyeglass lens having lens substrate layers over both surfaces of the film according to [7].

According to the composition for optical materials of the present invention, it is possible to obtain a lens substrate including a polyolefin and a photochromic compound or a photochromic film laminated to a lens substrate which is excellent in photochromic performance.

By using a specific α-olefin, it is possible to obtain a composition for optical materials formed by including a polyolefin and a photochromic compound, capable of obtaining an optical material having excellent photochromic performance.

DESCRIPTION OF EMBODIMENTS

The composition for optical materials of the present invention will be described based on the following embodiment.

The composition for optical materials of the present embodiment includes a polyolefin (A) obtained by (co)polymerizing at least one kind of olefin selected from α-olefins having 3 to 20 carbon atoms and a photochromic compound (B).

Hereinafter, each component will be described.

[Polyolefin (A)]

The polyolefin (A) in the present embodiment is obtained by (co)polymerizing at least one kind of olefin selected from α-olefins having 3 to 20 carbon atoms. Here, the term (co)polymerization is a concept including a case of polymerizing only the α-olefin described above and a case of copolymerizing the α-olefin described above and another olefin.

Specific examples of at least one kind of olefin selected from α-olefins having 3 to 20 carbon atoms include propylene, 1-butene, 1-pentene, 3-methyl-1-butene, 2-methyl-1-butene, 1-hexene, 4-methyl-1-pentene, 3-methyl-1-pentene, 2-methyl-1-pentene, 1-octene, 1-decene, 1-dodecene, 1-tetradecene, 1-hexadecene, 1-octadecene, and 1-eicosene.

Among these, as the α-olefin to be used, a branched α-olefin having 5 to 20 carbon atoms is preferable, 3-methyl-1-butene and 4-methyl-1-pentene are more preferable, and 4-methyl-1-pentene is still more preferable from the viewpoint of heat resistance and low dielectric characteristics of the obtained polyolefin.

In the polyolefin (A), the content of unit derived from at least one kind of olefin selected from branched α-olefins having 3 to 20 carbon atoms is 50 mol % to 100 mol %.

In a case where the polyolefin (A) is a homopolymer, the polyolefin (A) is obtained by polymerizing the above-described α-olefin having 3 to 20 carbon atoms, or preferably, one kind of olefin selected from branched α-olefins having 5 to 20 carbon atoms (constituting unit of α-olefin is 100 mol %).

In a case where the polyolefin (A) is a copolymer, the polyolefin (A) is obtained by copolymerizing two or more types of olefin selected from the above-described α-olefins having 3 to 20 carbon atoms. Among these, from the viewpoint of heat resistance and low dielectric characteristics of the obtained polyolefin, it is preferable that the polyolefin (A) has a branched α-olefin having 5 to 20 carbon atoms as a main constituting element and includes ethylene or an α-olefin (except the α-olefin selected from branched α-olefins having 5 to 20 carbon atoms which is the main constituting element) having 3 to 20 carbon atoms as another olefin to be copolymerized.

Specific examples of the α-olefin having 3 to 20 carbon atoms to be copolymerized include propylene, 1-butene, 1-pentene, 3-methyl-1-butene, 4-methyl-1-pentene, 1-hexene, 3-methyl-1-pentene, 1-octene, 1-decene, 1-dodecene, 1-tetradecene, 1-hexadecene, 1-octadecene, and 1-eicosene. These olefins may be used alone or in combination of two or more kinds thereof.

At this time, the lower limit of the content of unit derived from the branched α-olefin having 5 to 20 carbon atoms is 50 mol %, preferably 70 mol %, and more preferably 85 mol %, and the upper limit is less that 100 mol %, preferably 99.95 mol %, more preferably 99.9 mol %, and particularly preferably 99.8 mol %.

As the polyolefin (A), a 4-methyl-1-pentene homopolymer or a 4-methyl-1-pentene-based polymer consisting of a 4-methyl-1-pentene copolymer which has 4-methyl-1-pentene as a main constituting element is preferable.

Moreover, as the constituting element of the polyolefin (A) in the present invention, in addition to the above-described olefins, a functionalized vinyl compound, a polar group (for example, a carbonyl group, a hydroxyl group, an ether bond group, and the like), a monomer, a conjugated diene, and a nonconjugated polyene having a polymerizable carbon-carbon double bond in a molecule may be included within a range in which the object of the present invention is not impaired.

The polyolefin (A) of the present invention preferably satisfies the following requirements (A-i), (A-ii), and (A-iii).

(A-i) The melt flow rate (MFR) is 1 g/10 min to 500 g/10 min, preferably 2 g/10 min to 100 g/10 min, and more preferably 3 g/10 min to 30 g/10 min. The MFR is measured under the conditions of a measurement temperature of 260° C. and a load of 5 kgf according to ASTM D1238. When the MFR is in the above range, fluidity in a mold of the obtained polyolefin resin composition is high.

(A-ii) The melting point (Tm) is 220° C. to 250° C., preferably 224° C. to 245° C., more preferably 228° C. to 240° C. When the melting point is lower than 220° C., strength of the polyolefin (A) itself is decreased, and thus, there is a case where strength of the molded product obtained from polyolefin resin composition also is not sufficient. When the melting point is higher than 250° C., there is a case where impact strength and toughness of the molded product obtained from polyolefin resin composition are decreased. The melting point of the polyolefin (A) can be measured in a temperature range of 30° C. to 280° C. in a nitrogen atmosphere based on JIS-K7121. At this time, each of a rate of temperature increase and a cooling rate may be 10° C./min.

(A-iii) The specific gravity is 0.8 to 1.0 and preferably 0.8 to 0.9. When the specific gravity is in this range, it is possible to effectively exhibit photochromic performance of the obtained optical materials.

The polyolefin (A) is prepared by (co)polymerizing at least one kind of olefin selected from α-olefins having 3 to 20 carbon atoms in the presence of a known olefin polymerization catalyst such as a Ziegler-Natta catalyst, a metallocene catalyst, or a so-called post-metallocene catalyst.

More specifically, the polyolefin (A) is prepared by polymerizing an olefin constituting the polyolefin (A) in the presence of a polymerization catalyst including a transition metal catalyst component and a co-catalyst component.

The polymerization reaction of olefins in the preparation of the polyolefin (A) can be performed by a liquid phase polymerization method such as a solution polymerization, a suspension polymerization, or a bulk polymerization method, a gas phase polymerization method, or other known polymerization methods. In the preparation of the polyolefin (A), preferably, a liquid phase polymerization method such as a liquid phase polymerization or a suspension polymerization (slurry polymerization) is used, and more preferably, a suspension polymerization (slurry polymerization) method is used.

In a case where the polymerization is performed by the liquid phase polymerization method, it is also possible to use a non-active hydrocarbon as a solvent, and it is also possible to use a liquid olefin under the reaction conditions. In addition, it is possible to perform the polymerization by any method of a batch method, a semi-continuous method, and a continuous method; and it is possible to perform the polymerization in two or more stages by changing the reaction conditions. By supplying hydrogen to the polymerization reaction system, it is possible to adjust the molecular weight of the obtained polymer, and it is possible to adjust the melt flow rate of the polyolefin (A).

The polymerization temperature and the polymerization pressure in the polymerization vary depending on the polymerization method or the type of olefin to be polymerized. In general, the polymerization temperature is set to 10° C. to 200° C., preferably 30° C. to 150° C., and the polymerization pressure is set to atmospheric pressure to 5 MPaG, preferably 0.05 MPaG to 4 MPaG.

The transition metal catalyst component used in the preparation of the polyolefin (A) is a solid titanium catalyst, a metallocene catalyst, or the like which has magnesium and titanium as a transition metal, and a halogen atom or an electron donor as a ligand; and preferably a solid titanium catalyst.

Particularly preferably, the transition metal catalyst component is a solid titanium catalyst obtained by bringing a magnesium compound which is suspended in a non-active hydrocarbon solvent, a compound having two or more ether bonds through plural atoms as an electron donor, and a titanium compound in the liquid state into contact. The solid titanium catalyst has titanium atoms, magnesium atoms, halogen atoms, and plural ether bonds.

As the non-active hydrocarbon solvent used in the preparation of the solid titanium catalyst, hexane, decane, and dodecane can be exemplified; as the magnesium compound, magnesium chloride anhydride and methoxy magnesium chloride can be exemplified; and as the compound having two or more ether bonds through plural atoms as an electron donor, 2-isobutyl-2-isopropyl-1,3-dimethoxypropane and 2-isopentyl-2-isopropyl-1,3-dimethoxypropane can be exemplified.

By selecting the type of electron donor included in the solid titanium catalyst, it is possible to adjust the stereoregularity of the obtained polymer. As a result, the melting point of the polymer can be adjusted.

The atomic ratio (halogen atoms/titanium) of halogen atoms to titanium in the solid titanium catalyst is usually 2 to 100, and preferably 4 to 90. The molar ratio (compound including two or more ether bonds/titanium) of a compound including two or more ether bonds and titanium in the solid titanium catalyst is 0.01 to 100, and preferably 0.2 to 10. The atomic ratio (magnesium/titanium) of magnesium to titanium in the solid titanium catalyst is 2 to 100, and preferably 4 to 50.

Furthermore, suitable examples of the polymerization catalyst used in the olefin polymerization for obtaining the polyolefin (A) include magnesium-supported type titanium catalysts described in Japanese Unexamined Patent Publication No. 57-63310, Japanese Unexamined Patent Publication No. 58-83006, Japanese Unexamined Patent Publication No. 3-706, Japanese Patent No. 3476793, Japanese Unexamined Patent Publication No. 4-218508, Japanese Unexamined Patent Publication No. 2003-105022, and the like; and metallocene catalysts described in Pamphlet of International Publication No. WO01/53369, Pamphlet of International Publication No. WO01/27124, Japanese Unexamined Patent Publication No. 3-193796, Japanese Unexamined Patent Publication No. 02-41303, and the like. In a case of using the magnesium-supported type titanium catalyst including polyether as an electron donor component, a polyolefin (A) having a relatively narrow molecular weight distribution tends to be obtained, and thus, it is particularly preferable.

In a case where the monomer polymerization in the preparation of the polyolefin (A) is performed by a liquid phase polymerization method, it is preferable that the solid titanium catalyst is used in an amount of 0.0001 mmol to 0.5 mmol, and preferably in an amount of 0.0005 mmol to 0.1 mmol in terms of titanium atoms per liter of the total liquid volume.

The transition metal catalyst component is preferably supplied to the polymerization reaction system after suspending in an inert organic solvent (preferably, a saturated aliphatic hydrocarbon).

In addition, the transition metal catalyst component is preferably used as a solid catalyst component preliminarily polymerized with an α-olefin used for the polymerization. By the preliminary polymerization, 0.1 g to 1,000 g of the α-olefin is polymerized, preferably 0.3 g to 500 g is polymerized, more preferably 1 g to 200 g is polymerized per gram of the transition metal catalyst component. The preliminary polymerization can be performed at a higher catalyst concentration than the catalyst concentration in the reaction system in the polymerization of olefins.

The co-catalyst component used in the preparation of the polyolefin (A) is preferably an organometallic compound catalyst component, and specifically, an organic aluminum compound can be exemplified. The organic aluminum compound, for example, is represented as $R^a{}_n AlX_{3-n}$.

$R^a$ in $R^a{}_n AlX_{3-n}$ is a hydrocarbon group having 1 to 12 carbon atoms, and for example, is an alkyl group, a cycloalkyl group, or an aryl group. Specifically, $R^a$ is a methyl group, an ethyl group, an n-propyl group, an isopropyl group, an isobutyl group, a pentyl group, a hexyl group, an octyl group, a cyclopentyl group, a cyclohexyl group, a phenyl group, or a tolyl group. X in $R^a{}_n AlX_{3-n}$ is a halogen atom or a hydrogen atom, and n is 1 to 3.

Specific examples of the organic aluminum compound represented by $R^a{}_n AlX_{3-n}$ include trialkylaluminums such as trimethylaluminum, triethylaluminum, triisopropylaluminum, triisobutylaluminum, trioctylaluminum, and tri 2-ethylhexylaluminum; alkenylaluminums such as isoprenylaluminum; dialkylaluminum halides such as dimethylaluminum chloride, diethylaluminum chloride, diisopropylaluminum chloride, diisobutylaluminum chloride, and dimethylaluminum bromide; alkylaluminum sesquihalides such as methylaluminum sesquichloride, ethylaluminum sesquichloride, isopropylaluminum sesquichloride, butylaluminum sesquichloride, and ethylaluminum sesquibromide; alkylaluminum dihalides such as methylaluminum dichloride, ethylaluminum dichloride, isopropylaluminum dichloride, and ethylaluminum dibromide; and alkylaluminum hydrides such as diethylaluminum hydride and diisobutylaluminum hydride.

Among these, alkylaluminums such as triethylaluminum and triisobutylaluminum are preferable.

In a case where the transition metal catalyst component is a solid titanium catalyst, the co-catalyst component (organometallic compound catalyst component) in the preparation of the polyolefin (A) may be used in an amount capable of producing 0.1 g to $1 \times 10^6$ g, preferably $1 \times 10^2$ to $1 \times 10^6$ g of a polymer per gram of the solid titanium catalyst. In addition, the amount of the co-catalyst component (organometallic compound catalyst component) used is 0.1 moles to 1,000 moles, preferably 0.5 moles to 500 moles, and more preferably 1 mole to 200 moles per mole of titanium atoms in the solid titanium catalyst.

[Photochromic Compound (B)]

In the present embodiment, as the photochromic compound (B), various compounds can be used. For example, one or two or more types among a spiropyran-based compound, a chromene-based compound, a spirooxazine-based compound, a fulgide compound, and a bisimidazole compound can be used in a mixture thereof depending on the desired coloration.

In the present embodiment, among these, the spiropyran-based compound is preferably used, and the compound (hereinafter, also referred to as the compound (1)) represented by the following general formula (1) can be preferably used.

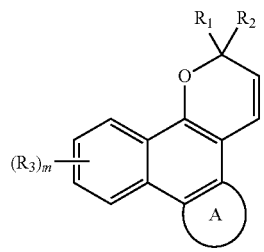

(1)

In a first embodiment, the compound represented by the above general formula (1) has the following substituents.

In the formula, $R_1$ and $R_2$ may be the same as or different from each other, and each of $R_1$ and $R_2$ independently represents a hydrogen atom;

a linear or branched alkyl group having 1 to 12 carbon atoms;

a cycloalkyl group having 3 to 12 carbon atoms;

an aryl group having 6 to 24 carbon atoms or a heteroaryl group having 4 to 24 carbon atoms which is substituted or unsubstituted; and an aralkyl or heteroaralkyl group (a linear or branched alkyl group having 1 to 4 carbon atoms is substituted with an aryl group or a heteroaryl group.)

The substituent of the substituted aryl group having 6 to 24 carbon atoms or the substituted heteroaryl group having 4 to 24 carbon atoms is at least one selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an —$NH_2$ group, an —NHR group, or a —$N(R)_2$ group (R is a linear or branched alkyl group having 1 to 6 carbon atoms. In a case where two Rs are present, the two Rs may be the same as or different from each other.), and a methacryloyl group or an acryloyl group.

$R_3$s may be the same as or different from each other, and each of $R_3$s independently represents a halogen atom;

a linear or branched alkyl group having 1 to 12 carbon atoms;

a cycloalkyl group having 3 to 12 carbon atoms;

a linear or branched alkoxy group having 1 to 12 carbon atoms;

a linear or branched haloalkyl group having 1 to 12 carbon atoms which is substituted with at least one halogen atom, a halocycloalkyl group having 3 to 12 carbon atoms which is substituted with at least one halogen atom, a linear or branched haloalkoxy group having 1 to 12 carbon atoms which is substituted with at least one halogen atom;

an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, and an amino group);

an aralkyl or heteroaralkyl group (a linear or branched alkyl group having 1 to 4 carbon atoms is substituted with the aryl group or the heteroaryl group.);

a substituted or unsubstituted phenoxy or naphthoxy group (which has at least one substituent selected from a linear or branched alkyl or alkoxy group having 1 to 6 carbon atoms);

—$NH_2$, —NHR, —$CONH_2$ or —CONHR (R is a linear or branched alkyl group having 1 to 6 carbon atoms); or —$OCOR_8$ or —$COOR_8$ (here, $R_8$ is a linear or branched alkyl group having 1 to 6 carbon atoms, a cycloalkyl group having 3 to 6 carbon atoms, or in $R_1$ and $R_2$, a phenyl group which is substituted with at least one substituent of a substituted aryl group or a substituted heteroaryl group or an unsubstituted phenyl group).

It is possible to form one or more aromatic ring groups or non-aromatic ring groups by bonding of at least two adjacent $R_a$s to each other and including the carbon atom to which $R_3$ is bonded. The aromatic ring group or non-aromatic ring group includes one ring or two annelated rings which may include a heteroatom selected from the group consisting of oxygen, sulfur, and nitrogen.

m is an integer of 0 to 4;

A of formula (1) represents the following formulae ($A_1$) to ($A_5$).

($A_1$)

($A_2$)

($A_3$)

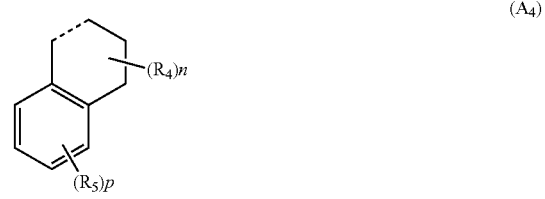

($A_4$)

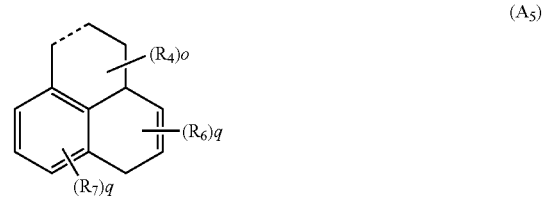

($A_5$)

In these annelated rings ($A_1$) to ($A_5$), a dotted line represents a carbon $C_5$-carbon $C_6$ bond of the naphthopyran ring in the general formula (1). The α bond of the annelated ring ($A_4$) or ($A_5$) is bonded to the carbon $C_5$ or $C_6$ of the naphthopyran ring in the general formula (1).

$R_4$s may be the same as or different from each other, and each of $R_4$s independently represents OH or a linear or branched alkyl group or alkoxy group having 1 to 6 carbon atoms, or two $R_4$s form a carbonyl (CO).

Each of $R_5$, $R_6$, and $R_7$ independently represents a halogen atom (preferably, fluorine, chlorine, or bromine);

a linear or branched alkyl group having 1 to 12 carbon atoms (preferably, a linear or branched alkyl group having 1 to 6 carbon atoms);

a linear or branched haloalkyl group having 1 to 6 carbon atoms which is substituted with at least one halogen atom (preferably, a fluoroalkyl group);

a cycloalkyl group having 3 to 12 carbon atoms;

a linear or branched alkoxy group having 1 to 6 carbon atoms;

a substituted or unsubstituted phenyl or benzyl group (which has at least one of substituents described above in the definition of $R_1$ and $R_2$ groups as a substituent in a case where each of $R_1$ and $R_2$ groups in the general formula (1) independently corresponds to an aryl or heteroaryl group);

—$NH_2$ or —NHR (here, R is a linear or branched alkyl group having 1 to 6 carbon atoms);

a substituted or unsubstitutedphenoxy or naphthoxy group (which has at least a linear or branched alkyl group or alkoxy group having 1 to 6 carbon atoms as a substituent);

a —$COR_9$, —$COOR_9$, or —$CONHR_9$ group (here, $R_9$ represents a linear or branched alkyl group having 1 to 6 carbon atoms, a cycloalkyl group having 3 to 6 carbon atoms, or a substituted or unsubstituted phenyl or benzyl group (which has at least one of substituents described above in the definition of $R_1$ and $R_2$ groups as a substituent in a case where each of $R_1$ and $R_2$ groups in the general formula (1) independently corresponds to an aryl or heteroaryl group)).

n is an integer 0 to 6, o is an integer 0 to 2, p is an integer 0 to 4, and q is an integer 0 to 3.

The photochromic compound (B) of the general formula (1) has the combination of high colorability even at 40° C. and the discoloration rate that is applied to the use being required. The colors capable of being easily achieved are colors from orange to blue.

In the first embodiment, a compound in which A of the compound (1) is the annelated ring ($A_1$) or ($A_2$) described above can be exemplified.

In a second embodiment, a compound in which A of the compound (1) is the annelated ring ($A_3$), ($A_4$), or ($A_5$) described above can be exemplified.

Moreover, in the present embodiment, a mixture of the compound (1) belonging to at least one different type selected from the group consisting of the compound (1) in which A is ($A_1$), the compound (1) in which A is ($A_2$), the compound (1) in which A is ($A_3$), the compound (1) in which A is ($A_4$), and the compound (1) in which A is ($A_5$) is also included.

A compound in a third embodiment is the compound of the general formula (1) in which at least two adjacent $R_3$ groups form an aromatic group or a non-aromatic group. The aromatic group or non-aromatic group has one ring (for example, a phenyl group) or two annelated rings (for example, a benzofuran group) which optionally include at least one heteroatom selected from the group consisting of oxygen, sulfur, and nitrogen. The annelated ring is optionally substituted with at least one substituent selected from substituents of the aryl or heteroaryl group in $R_1$ and/or $R_2$.

In the group in the third embodiment, in particular, the compound (1) in which two adjacent $R_3$s form at least one annelated ring, for example, a benzo group, and at least one aliphatic ring and/or aromatic ring A corresponding to ($A_1$), ($A_2$), ($A_3$), ($A_4$), or ($A_5$) is bonded to carbons 5 and 6 of the phenanthrene skeleton is included.

The compound in the third embodiment, in particular, is naphthopyran (I) in which two adjacent $R_3$s form at least one annelated ring, for example, a benzo group, and at least one substituted or unsubstituted aliphatic ring or aromatic ring is connected to carbons 5 and 6 of the phenanthrene skeleton.

The compound in a fourth embodiment is the compound of the general formula (1) in which A corresponds to ($A_1$) or ($A_2$) having at least one $R_4$ substituent different from a hydrogen atom, except for the compounds in which at least two adjacent $R_3$s do not form at least one aromatic group or non-aromatic group. The excluded aromatic group or non-aromatic group has one ring (for example, a phenyl group) or two annelated rings (for example, a benzofuran group) which optionally include at least one heteroatom selected from the group consisting of oxygen, sulfur, and nitrogen, and a ring which is optionally substituted with at least one substituent selected from substituents of the aryl or heteroaryl group in $R_1$ and/or $R_2$.

The compound according to the fourth embodiment, in particular, is naphthopyran (I) in which two $R_a$s do not form an annelated ring, for example, m is 1 and $R_3$ is —OMe, and carbons 5 and 6 of the naphtho skeleton are connected to at least one aliphatic ring A different from ($A_1$) and ($A_2$).

Preferably, the compound according to the present embodiment is a compound in which, in the general formula (1), $R_1$ and $R_2$ may be the same as or different from each other, and each of $R_1$ and $R_2$ independently represents an aryl or heteroaryl group which is optionally substituted, and the basic structure thereof is selected from the group consisting of a phenyl group, a naphthyl group, a biphenyl group, a pyridyl group, a furyl group, a benzofuryl group, a dibenzofuryl group, an N—($C_1$-$C_6$) alkyl carbazole group, a thienyl group, a benzothienyl group, a dibenzothienyl group, and an euroridinyl group, $R_1$ and/or $R_2$ preferably represents a para-substituted phenyl group, or in which an adamantyl or norbornyl group is formed by bonding of $R_1$ and $R_2$.

As the compound (1), the compound represented by the following general formula (4) can be preferably used.

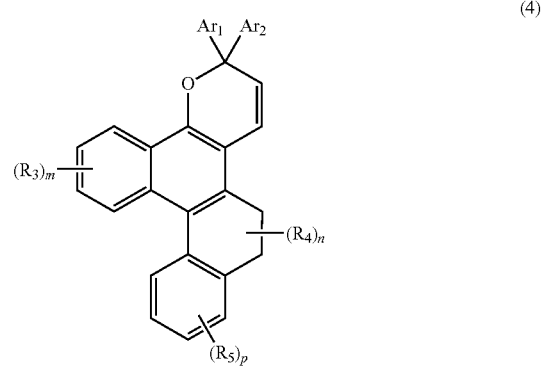

(4)

In the formula (4), $Ar_1$ and $Ar_2$ are aromatic groups, these may be the same as or different from each other, and each of $Ar_1$ and $Ar_2$ represents a benzene ring or a thiophene ring which be optionally substituted. As the substituent of the benzene ring or the thiophene ring, a linear or branched alkyl group having 1 to 10 carbon atoms, a linear or branched alkoxy group having 1 to 10 carbon atoms, or a linear or branched alkyl mono (or di) substituted amino group having 1 to 6 carbon atoms can be exemplified. $R_3$, $R_4$, $R_5$, m, n, and p have the same definitions as those described above.

As the compound (1), the compound represented by the following general formula (5) can be further preferably used.

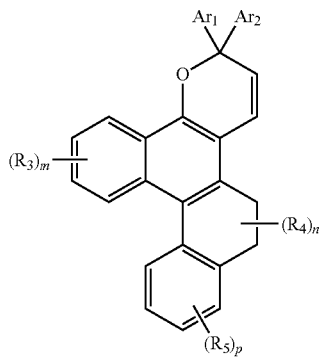

(4)

In the formula (5), $R_{10}$ and $R_{11}$ may be the same as or different from each other, and each of $R_{10}$ and $R_{11}$ represents a linear or branched alkyl group having 1 to 10 carbon atoms, a linear or branched alkoxy group having 1 to 10 carbon atoms, or a linear or branched alkyl mono (or di) substituted amino group having 1 to 6 carbon atoms. When m is 2, it is possible to form a ring structure by bonding of adjacent $R_3$s to each other and including the carbon atom to which $R_3$ is bonded. r and s are integers of 0 to 4. The above ring structure is a substituted or unsubstituted aryl group having 6 to 24 carbon atoms or a substituted or unsubstituted heteroaryl group having 3 to 24 carbon atoms.

$R_3$, $R_4$, $R_5$, m, n, and p have the same definitions as those described above.

As specific examples of the compound represented by the general formula (5), the compound represented by the following formula (6) or (7) can be exemplified. In the present invention, the compounds represented by the following formula (6) or (7) are preferable.

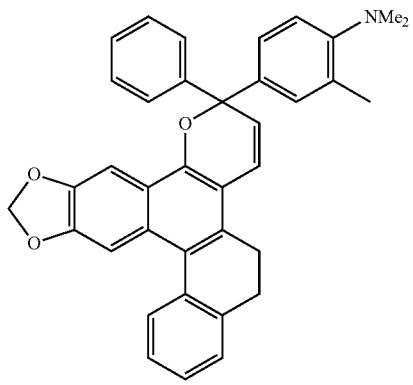

(6)

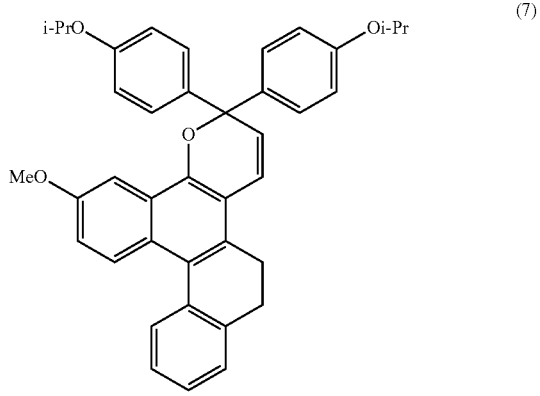

(7)

The compound represented by the general formula (1) which is the photochromic compound (B) can be synthesized by a known method. For example, the compound can also be synthesized by the method described in Japanese Unexamined Patent Publication No. 2004-500319.

The amount of the photochromic compound added is preferably equal to or greater than 500 ppm with respect to 100 parts by weight of the polyolefin (A), and specifically, 500 ppm to 1,000 ppm is preferable. When the amount is in the above range, it is possible to more effectively exhibit photochromic performance.

The composition for optical materials of the present embodiment may further include a resin modifier or the like as another component, in addition to the polyolefin (A) and the photochromic compound (B).

According to the present invention, from the viewpoint of excellent photochromic performance, a (co)polymer of an α-olefin is preferably used as the polyolefin (A).

<Process for Producing Composition for Optical Materials>

The composition for optical materials of the present embodiment is produced by a general method of melting and kneading the polyolefin (A), the photochromic compound (B), and other optional components using a roll mill, a Banbury mixer, or an extruder, however, the method is not particularly limited as long as it can uniformly disperse the components. That is, for the composition for optical materials finally obtained, if respective components are mixed in a state in which there is no substantial problem, any blending method of the respective components that are contained in the composition and step may be used. For example, a method in which after blending the respective components of the resin composition so as to have a desired mixing ratio, the resultant product is introduced into a twin screw extruder set to a temperature higher than the melting point of the resin, then, melted and kneaded to uniformly disperse the respective components, and cooled and pelletized, whereby a desired composition for optical materials is obtained can be mentioned.

<Various Molded Products Comprised of Composition for Optical Materials>

As the method for molding the composition for optical materials of the present embodiment in various shapes of molded product such as a film, a sheet, and a lens, various known methods such as extrusion molding, injection molding, press molding, inflation molding, laminate molding, and blow molding can be applied.

<Use>

The composition for optical materials of the present embodiment can be used for optical materials or the like having the following configuration.

Plastic lens A: A lens substrate comprised of the composition for optical materials is provided.

Plastic lens B: A film or layer comprised of the composition for optical materials is provided over at least one surface of lens substrate (except for the lens substrate obtained from the composition for optical materials) surfaces.

Plastic lens C: A lens substrate (except for the lens substrate obtained from the composition for optical materials) is stacked over both surfaces of a film comprised of the composition for optical materials.

The optical material can be suitably used as a plastic eyeglass lens.

(Plastic Lens A)

Although a method for manufacturing the plastic lens A having a lens substrate comprised of the composition for optical materials is not particularly limited, as a preferred manufacturing method, injection molding can be exemplified.

Specifically, for example, pellets obtained by melting and kneading the polyolefin (A), the photochromic compound (B), and other optional components are melted and softened, and a mold of a mold temperature of 40° C. to 100° C. is filled with the melted and softened pellets at an injection temperature of 250° C. to 300° C., whereby an injection molded product can be obtained in a cooling time of 20 seconds to 120 seconds.

As other optional components in the present embodiment, depending on purposes, various additives such as a chain extender, a crosslinking agent, a photostabilizer, an ultraviolet absorbent, an antioxidant, a bluing agent, an oil-soluble dye, a filler, and an adhesion improver may be added to the composition for optical materials.

In addition, the plastic lens A in the present embodiment may have various coating layers over the lens substrate comprised of the composition for optical materials in accordance with the purpose or use.

(Plastic Lens B)

The plastic lens B in the present embodiment has a film or layer comprised of the composition for optical materials over at least one surface of lens substrate. The lens substrate is not a lens substrate comprised of the composition for optical materials of the present embodiment.

As the manufacturing method of the plastic lens B, (1) a method in which a lens substrate is manufactured, and a film or sheet comprised of the composition for optical materials is laminated to at least one surface of the lens substrate, and (2) a method in which in a cavity of a molding mold held by a gasket or a tape as described below, a film or sheet comprised of the composition for optical materials is arranged along one of the inner walls of the mold, and a polymerizable composition is injected into the cavity and cured can be exemplified.

The film or sheet comprised of the composition for optical materials used in the method of the above (1) is not particularly limited, and a film or sheet can be obtained from pellets of the composition for optical materials obtained by melting and kneading or impregnation, by various known methods in the related art, specifically, for example, molding methods such as an injection molding method, a profile extrusion molding method, a pipe molding method, a tube molding method, a coating molding method of a heterogeneous molded product, an injection blow molding method, a direct blow molding method, a T-die sheet or film molding method, an inflation film molding method, and a press molding method.

The lens substrate can be obtained from a known optical resin, and as the optical resin, a (thio) urethane resin, an episulfide resin, and the like can be exemplified.

As the method for laminating the film or sheet comprised of the composition for optical materials over the surface of the lens substrate, known methods can be used.

In the cast polymerization in the method of the above (2), as a lens casting mold, a lens casting mold configured of two molds held by a gasket is generally used.

As the material of the gasket, polyvinyl chloride, an ethylene-vinyl acetate copolymer, an ethylene-ethyl acrylate copolymer, an ethylene-propylene copolymer, an ethylene-propylene-diene copolymer, a polyurethane elastomer, fluorine rubber, or soft elastic resins formed by blending polypropylene with these is used. Materials which do not swell and are not eluted with respect to the polymerizable composition used in the present embodiment are preferable.

As the material of the mold, glass, a metal, and the like can be exemplified, and glass is generally used. In order to improve the releasability of the obtained lens, the mold may be previously coated with a releasing agent. In addition, the mold may be previously coated with a coating liquid for imparting hard coat performance to the lens material.

Furthermore, the composition for optical materials is injected into a cavity of the molding mold held by a gasket, tape, or the like. At this time, there are many cases in which a degassing treatment under reduced pressure, a filtration treatment such as pressurization or depressurization, and the like are preferably carried out as necessary depending on properties that obtained plastic lenses require.

Furthermore, after the composition is injected in the lens casting molds, the mold is heated to cure and mold the composition in a heatable device such as an oven or in water using a predetermined temperature program. The resin molded product may be subjected to a treatment such as annealing as necessary.

As the polymerizable composition, (thio)urethane-based polymerizable compositions including isocyanate, thiol, and alcohol can be exemplified.

In addition, the plastic lens B in the present embodiment may have various coating layers over a lens substrate comprised of the composition for optical materials or a "film or layer" in accordance with the purpose or use.

(Plastic Lens C)

In the plastic lens C in the present embodiment, a lens substrate (except for the lens substrate obtained from the composition for optical materials) is laminated over both surfaces of a film comprised of the composition for optical materials.

As the manufacturing method of the plastic lens C, (1) a method in which a lens substrate is manufactured, and the lens substrate is laminated over both surfaces of a film or sheet comprised of the composition for optical materials, and (2) a method in which in a cavity of a molding mold held by a gasket or a tape, a film or sheet comprised of the composition for optical materials is arranged in a state of being separated from the inner wall of the mold, and a polymerizable composition is injected into the cavity and cured can be exemplified.

As the film or sheet comprised of the composition for optical materials and the lens substrate used in the method of the above (1), the same as those in the method of (1) of the plastic lens B can be used. As the method for laminating the film or sheet comprised of the composition for optical materials over the surface of the lens substrate, known methods can be used.

The method of the above (2) can be performed specifically in the following manner.

The film or sheet comprised of the composition for optical materials in the space of the lens casting mold used in the manufacturing method of the plastic lens B is provided such that both surfaces of the film or sheet becomes parallel to the mold inner surface on the front side opposing both surfaces of the film or sheet.

Then, a (thio)urethane-based polymerizable composition including isocyanate, thiol, and alcohol or the like is injected into two spaces between the mold inner surfaces and a polarizing film in the cavity of the lens casting mold by predetermined injection means. At this time, there are many cases in which a degassing treatment under reduced pressure, a filtration treatment such as pressurization or depressurization, and the like are preferably carried out as necessary depending on properties that obtained plastic lenses require.

Furthermore, after the composition is injected, the lens casting mold is heated to cure and mold the composition in a heatable device such as an oven or in water using a predetermined temperature program. The resin molded product may be subjected to a treatment such as annealing as necessary.

In addition, the plastic lens C in the present embodiment may have various coating layers over the lens substrate in accordance with the purpose or use.

[Plastic Eyeglass Lens]

Using the plastic lens of the present embodiment, it is possible to obtain an eyeglass lens. Moreover, a coating layer may be provided over one surface or both surfaces as necessary.

Specific examples of the coating layer include a primer layer, a hard coating layer, an antireflection layer, an antifog coated layer, an antifouling layer, a water-repellent layer, and the like. It is possible to use each of the above coating layers solely, or it is possible to use after multilayering a plurality of coating layers. In a case where the coating layers are provided over both surfaces, similar coating layers may be provided over the respective surfaces, or different coating layers may be provided.

In the coating layers, an ultraviolet absorbent for the purpose of protecting the lenses or the eyes from ultraviolet rays, an infrared absorbent for the purpose of protecting the eyes from infrared rays, a light stabilizer or an antioxidant for the purpose of improving weather resistance of the lenses, a dye or pigment for the purpose of improving fashionability of lenses, furthermore, a photochromic dye or photochromic pigment, an antistatic agent and other well-known additives for enhancing performances of lenses may be jointly used respectively. For layers coated by coating, a variety of leveling agents may be used for the purpose of improving coatability.

The primer layer is generally formed between the hard coating layer described below and a lens. The primer layer is a coating layer for the purpose of improving adhesion between the hard coating layer formed over the primer layer and the lens, and, depending on cases, it is also possible to improve impact resistance. Although any material can be used for the primer layer as long as the material has high adhesion to an obtained lens; in general, a primer composition mainly including an urethane-based resin, an epoxy-based resin, a polyester-based resin, a melanin-based resin, polyvinyl acetal, or the like is used. For the primer composition, a suitable solvent having no influence over lenses may be used for the purpose of adjusting a viscosity of the composition. It is needless to say that the primer composition may be used without a solvent.

The primer layer can be formed by any one of a coating method and a dry method. In a case where the coating method is used, the primer layer is formed by coating the primer composition over a lens by a well-known coating method such as a spin coating or a dip coating, and then solidifying the primer composition. In a case where the dry method is performed, the primer layer is formed by a well-known dry method such as a CVD method or a vacuum deposition method. When the primer layer is formed, a pretreatment such as an alkali treatment, a plasma treatment, or an ultraviolet treatment may be performed on surfaces of a lens as necessary for the purpose of improving adhesion.

The hard coating layer is a coating layer for the purpose of supplying functions of abrasion resistance, wear resistance, moisture resistance, warm water resistance, thermal resistance, weather resistance, and the like to the surfaces of a lens.

The hard coating layer is generally obtained from a hard coating composition including an organic silicon compound having a curing property and one or more types of oxide fine particles of an element selected from an element group of Si, Al, Sn, Sb, Ta, Ce, La, Fe, Zn, W, Zr, In, and Ti, and/or one or more types of fine particles made up of a composite oxide of two or more types of element selected from the above element group.

The hard coating composition preferably includes at least any one of amines, amino acids, a metal acetylacetonate complex, an organic acid metallic salt, perchloric acids, salts of perchloric acid, acids, metallic chlorides, and a polyfunctional epoxy compound. For the hard coating composition, a suitable solvent having no influence on lenses may be used, or the composition may be used without a solvent.

The hard coating layer is generally formed by coating with the hard coating composition by a well-known coating method such as a spin coating or a dip coating, and then curing the composition. Examples of a curing method include a curing method in which thermal curing or radiation of energy rays, such as ultraviolet rays or visible light rays, is used. A refractive index of the hard coating layer is preferably in a range of a difference of ±0.1 from the refractive index of the lens in order to suppress the occurrence of an interference fringe.

The antireflection layer is generally formed over the hard coating layer as necessary. There are inorganic antireflection layers and organic antireflection layers as the antireflection layer, and the inorganic antireflection layers are formed using an inorganic oxide such as $SiO_2$ or $TiO_2$ by a dry method such as a vacuum deposition method, a sputtering method, an ion plating method, an ion beam assisting method, or a CVD method. The organic antireflection layers are formed using a composition including an organic silicon compound and silica-based fine particles having internal cavities by a wet method.

Single antireflection layer or multiple antireflection layers may be provided, and, in a case where single antireflection layer is used, the refractive index of the antireflection layer is preferably smaller than the refractive index of the hard coating layer by at least 0.1 or greater. In order to effectively develop an antireflection function, it is preferable to form multiple antireflection films, and, in this case, films having a low refractive index and films having a high refractive index are alternately stacked. Even in this case, a difference in the refractive index between the films having a low refractive index and the films having a high refractive index is preferably equal to or greater than 0.1. Examples of the films having a high refractive index include films of ZnO, $TiO_2$, $CeO_2$, $Sb_2O_5$, $SnO_2$, $ZrO_2$, $Ta_2O_5$, and the like, and examples of the films having a low refractive index include $SiO_2$ films, and the like.

The antifog layer, the antifouling layer, and the water-repellent layer are formed over the antireflection film layer as necessary. Regarding a method for forming the antifog layer, the antifouling layer, and the water-repellent layer, treatment methods, treatment materials, and the like are not particularly limited as long as no adverse influences are brought to the antireflection function, and a well-known antifog treatment method, an antifouling treatment method, a water-repellency-providing treatment method, and materials can be used. Examples of the antifog treatment method and the antifouling treatment method include a method in which the surface is covered with a surfactant, a method in which a hydrophilic film is added to the surface so as to provide water absorbability, a method in which the surface is coated with fine irregularity so as to enhance water absorbability, a method in which a photocatalytic activity is used so as to provide water absorbability, a method in which a super water-repellency-providing treatment is performed so as to prevent attachment of water droplets, and the like. In addition, examples of the water-repellency-providing treatment method include a method in which a water-repellency-provided layer is formed using a fluorine-containing silane compound or the like by deposition or sputtering, a method in which a fluorine-containing silane compound is dissolved in a solvent and then coated so as to form a water-repellency-provided layer, and the like.

EXAMPLES

Hereinafter, the present invention will be described in more detail based on Examples, but the invention is not intended to be limited to these. Moreover, the materials and the evaluation method used in Examples of the present invention were as follows.

<Polyolefin (A)>

As a polyolefin (A), the following resins of the following trade names were used.

(A-1) Poly-4-methyl-1-pentene (trade name: TPX, manufactured by Mitsui Chemicals, Inc.) (melting point: 232° C. MFR (ASTM D1238, 260° C., 5 kgf): 27 g/10 min, specific gravity: 0.83))

(A-2) Poly-4-methyl-1-pentene (trade name: TPX, manufactured by Mitsui Chemicals, Inc.) (melting point: 224° C. MFR (ASTM D1238, 260° C., 5 kgf): 21 g/10 min, specific gravity: 0.83))

<Photochromic Compound (B)>

As the photochromic compound (B), the following compound was used.

(B-1) A compound represented by the formula (6)

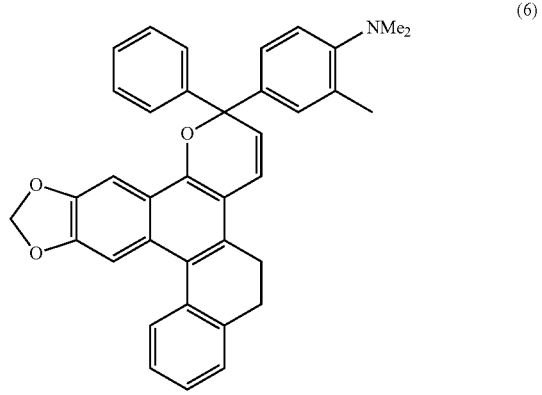 [SMILES: Cc1cc(C2(c3ccccc3)C=Cc3c4c(c5cc6c(cc5c3O2)OCO6)-c2ccccc2CC4)ccc1N(C)C]

(6)

(B-2) A photochromic compound (Volcanic Gray, manufactured by Vivimed Labs Ltd.)

[Test Piece (Rectangular Plate) Manufacturing Method]

First, pellets for evaluation were prepared by the following method. The photochromic compound (B) was mixed in the mixing amount described in Example with respect to 100 parts by weight of the polyolefin (A) or (C). Furthermore, the mixture was kneaded using a twin screw extruder (manufacturer: TECHNOVEL, model number KZW15T, ϕ=15 mm, L/D=30, photochromic pigment: top feed, cylinder temperature: 250° C.), whereby pellets for evaluation were obtained.

The obtained pellets were made to be a rectangular plate (thickness of 2.0 mm) using an injection molding machine (Nissei 30TON (ϕ=19 mm), injection temperature: 260° C. to 300° C., mold temperature: 40° C. to 60° C., cooling time: 15 seconds to 20 seconds, type of test piece: rectangular plate).

[Evaluation Method]

Photochromic performance of the obtained rectangular plate was evaluated by the following method.

Photochromic performance: A resin flat plate having a thickness of 2.0 mm was produced, then, the resin flat plate was irradiated with ultraviolet rays having a wavelength of 365 nm for 60 minutes from a position at a height of 155 mm using a handy UV lamp SLUV-6 manufactured by AS ONE Corporation, and the color of the resin flat plate after irradiation of ultraviolet rays was measured as a L* value, an a* value, and a b* value using a colorimeter (CR-200, manufactured by Konica Minolta, Inc.). The amount of change in the color was calculated by the following equation based on L* values, a* values, and b* values before and after irradiation of ultraviolet rays.

$$\Delta E^*ab=[(\Delta L^*)^2+(\Delta a^*)^2+(\Delta b^*)^2]^{1/2}$$

When a ΔE*ab value was equal to or greater than 6, this was evaluated as O, when a ΔE*ab value was equal to or greater than 4 and less than 6, this was evaluated as Δ, and when a ΔE*ab value was equal to or less than 4, this was evaluated as X.

Example 1

The photochromic compound (B-1) was mixed so as to have a concentration of 500 ppm with 100 parts by weight of poly-4-methyl-1-pentene (A-1), whereby a composition for an optical material was obtained. Then, a rectangular plate was manufactured according to the above "Test Piece (rectangular plate) Manufacturing Method", and the photochromic performance thereof was evaluated by the above "Evaluation Method". The physical property measurement results are shown in the table.

Example 2

The photochromic compound (B-1) was mixed so as to have a concentration of 500 ppm with 100 parts by weight of poly-4-methyl-1-pentene (A-2), whereby a composition for an optical material was obtained. Then, a rectangular plate was manufactured according to the above "Test Piece (rectangular plate) Manufacturing Method", and the photochromic performance thereof was evaluated by the above "Evaluation Method". The physical property measurement results are shown in the table.

Example 3

The photochromic compound (B-2) was mixed so as to have a concentration of 500 ppm with 100 parts by weight of poly-4-methyl-1-pentene (A-1), whereby a composition for an optical material was obtained. Then, a rectangular plate was manufactured according to the above "Test Piece (rectangular plate) Manufacturing Method", and the photochromic performance thereof was evaluated by the above "Evaluation Method". The physical property measurement results are shown in the table.

Example 4

The photochromic compound (B-2) was mixed so as to have a concentration of 500 ppm with 100 parts by weight of poly-4-methyl-1-pentene (A-2), whereby a composition for an optical material was obtained. Then, a rectangular plate was manufactured according to the above "Test Piece (rectangular plate) Manufacturing Method", and the photochromic performance thereof was evaluated by the above "Evaluation Method". The physical property measurement results are shown in the table.

Comparative Example 1

As a polyolefin, the following resins of the following trade names were used.
(C) Ethylene-tetracyclododecene copolymer (trade name: APEL, manufactured by Mitsui Chemicals, Inc.) (Tg: 125° C., MFR (ASTM D1238, 260° C., 2.16 kgf): 15 g/10 min, specific gravity: 1.04))
As the photochromic compound (B), the following compound was used.
(B-3) A compound represented by the formula (7)

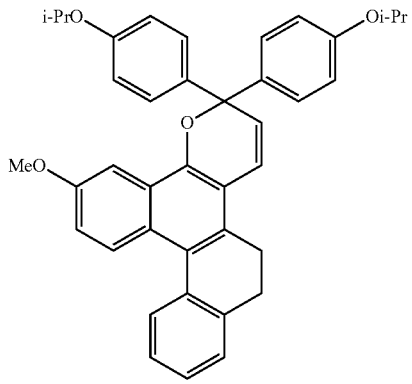

The photochromic compound (B-3) was mixed so as to have a concentration of 500 ppm with 100 parts by weight of an ethylene-tetracyclododecene copolymer (C), whereby a composition for an optical material was obtained. Then, a rectangular plate was manufactured according to the above "Test Piece (rectangular plate) Manufacturing Method", and the photochromic performance thereof was evaluated by the above "Evaluation Method". The physical property measurement results are shown in the table.

Comparative Example 2

The photochromic compound (B-2) was mixed so as to have a concentration of 500 ppm with 100 parts by weight of an ethylene-tetracyclododecene copolymer (C), whereby a composition for an optical material was obtained. Then, a rectangular plate was manufactured according to the above "Test Piece (rectangular plate) Manufacturing Method", and the photochromic performance thereof was evaluated by the above "Evaluation Method". The physical property measurement results are shown in the table.

TABLE 1

| Example/Comparative Example | No. | Polyolefin Type | Specific gravity | Photochromic compound (B) | Color difference [$\Delta E^*ab$] | Photochromic performance determination |
|---|---|---|---|---|---|---|
| Example 1 | A-1 | Poly-4-methyl-1-pentene | 0.83 | B-1 | 18 | ○ |
| Example 2 | A-2 | Poly-4-methyl-1-pentene | 0.83 | B-1 | 14 | ○ |
| Example 3 | A-1 | Poly-4-methyl-1-pentene | 0.83 | B-2 | 23 | ○ |
| Example 4 | A-2 | Poly-4-methyl-1-pentene | 0.83 | B-2 | 20 | ○ |
| Comparative Example 1 | C | Ethylene-tetracyclododecene copolymer | 1.04 | B-3 | 1 | X |
| Comparative Example 2 | C | Ethylene-tetracyclododecene copolymer | 1.04 | B-2 | 0 | X |

Moreover, a rectangular plate was produced in the same manner as in Example 1 except that the photochromic compound (B-3) was used instead of the photochromic compound (B-1), then, photochromic performance was evaluated, and the evaluation result was 0.

As in Examples 1 to 4, in a case of using a polymer of 4-methyl-1-pentene which is an α-olefin having 6 carbon atoms as the polyolefin (A), it was possible to obtain an optical material having excellent photochromic performance from a composition for optical materials including the polyolefin (A) and the photochromic compound (B).

In contrast, as in Comparative Examples 1 and 2, in a case of using a copolymer of tetracyclododecene which is a cyclic olefin as a polyolefin, it was not possible to obtain an optical material having satisfactory photochromic performance from a composition for optical materials including the polyolefin and the photochromic compound (B).

This application claims priority from Japanese Patent Application No. 2012-261889 filed on Nov. 30, 2012, the content of which is incorporated herein by reference in its entirety.

The invention claimed is:

1. A composition for optical materials, comprising:
a polyolefin (A) obtained by (co)polymerizing at least one kind of olefin selected from propylene, 1-butene, 1-pentene, 3-methyl-1-butene, 2-methyl-1-butene, 1-hexene, 4-methyl-1-pentene, 3-methyl-1-pentene, 2-methyl-1-pentene, 1-octene, 1-decene, 1-dodecene, 1-tetradecene, 1-hexadecene, 1-octadecene, and 1-eicosene; and
a photochromic compound (B).

2. The composition for optical materials according to claim 1,
wherein the photochromic compound (B) is represented by the following general formula (1).

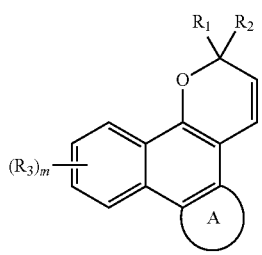
(1)

wherein, in the formula, $R_1$ and $R_2$ may be the same as or different from each other, and each of $R_1$ and $R_2$ independently represents a hydrogen atom;
a linear or branched alkyl group having 1 to 12 carbon atoms;
a cycloalkyl group having 3 to 12 carbon atoms;
an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one linear or branched alkyl group or alkoxy group having 1 to 12 carbon atoms, a linear or branched alkenyl group having 2 to 12 carbon atoms, an —$NH_2$ group, an —NHR group, an —$N(R)_2$ group (R is a linear or branched alkyl group having 1 to 6 carbon atoms and where two Rs are present, the two Rs may be the same as or different from each other, and a methacryloyl group or an acryloyl group); or
an aralkyl or heteroaralkyl group (a linear or branched alkyl group having 1 to 4 carbon atoms is substituted with an aryl group or a heteroaryl group, $R_3$s may be the same as or different from each other, and each of $R_3$s independently represents a halogen atom;
a linear or branched alkyl group having 1 to 12 carbon atoms;
a cycloalkyl group having 3 to 12 carbon atoms;
a linear or branched alkoxy group having 1 to 12 carbon atoms;
a linear or branched haloalkyl group having 1 to 12 carbon atoms which is substituted with at least one halogen atom, a halocycloalkyl group having 3 to 12 carbon atoms which is substituted with at least one halogen atom, a linear or branched haloalkoxy group having 1 to 12 carbon atoms which is substituted with at least one halogen atom;
an aryl group having 6 to 24 carbon atoms or a heteroaryl group having 4 to 24 carbon atoms which is substituted or unsubstituted (which has at least one substituent selected from a halogen atom, a hydroxy group, a linear or branched alkyl group having 1 to 12 carbon atoms, a linear or branched alkoxy group having 1 to 12 carbon atoms, a linear or branched haloalkyl group having 1 to 12 carbon atoms which is substituted with at least one halogen atom, a linear or branched haloalkoxy group having 1 to 12 carbon atoms which is substituted with at least one halogen atom, a phenoxy group or a naphthoxy group which is substituted with at least one a linear or branched alkyl group or alkoxy group having 1 to 12 carbon atoms, a linear or branched alkenyl group having 2 to 12 carbon atoms, and an amino group);
an aralkyl or heteroaralkyl group (a linear or branched alkyl group having 1 to 4 carbon atoms is substituted with an aryl group or a heteroaryl group);
a substituted or unsubstituted phenoxy or naphthoxy group (which has at least one substituent selected from a linear or branched alkyl or alkoxy group having 1 to 6 carbon atoms);
—$NH_2$, —NHR, —$CONH_2$ or —CONHR (R is a linear or branched alkyl group having 1 to 6 carbon atoms); or
—$OCOR_8$ or —$COOR_8$ (here, $R_8$ is a linear or branched alkyl group having 1 to 6 carbon atoms, a cycloalkyl group having 3 to 6 carbon atoms, or in $R_1$ and $R_2$, a phenyl group which is substituted with at least one substituent of a substituted aryl group or a substituted heteroaryl group or an unsubstituted phenyl group), m is an integer of 0 to 4;

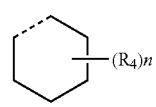
(A2)

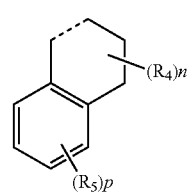
(A4)

A of formula (1) represents an annelated ring of the above formula ($A_2$) or ($A_4$), and in these annelated rings, a dotted line represents a carbon $C_5$-carbon $C_6$ bond of the naphthopyran ring in the general formula (1);
an α bond of an annelated ring ($A_4$) can be normally bonded to the carbon $C_5$ or $C_6$ of the naphthopyran ring in the general formula (1);
$R_4$s may be the same as or different from each other, each of $R_4$s independently represents OH or a linear or branched alkyl group or alkoxy group having 1 to 6 carbon atoms, or two $R_4$s form a carbonyl (CO);
$R_5$ represents a halogen atom;
a linear or branched alkyl group having 1 to 12 carbon atoms;
a linear or branched haloalkyl group having 1 to 6 carbon atoms which is substituted with at least one halogen atom;
a cycloalkyl group having 3 to 12 carbon atoms;
a linear or branched alkoxy group having 1 to 6 carbon atoms;
a substituted or unsubstituted phenyl or benzyl group (which has at least one of substituents described above in the definition of $R_1$ and $R_2$ groups as a substituent in a case where each of $R_1$ and $R_2$ groups in the general formula (1) independently corresponds to an aryl or heteroaryl group);
—$NH_2$ or —NHR (here, R is a linear or branched alkyl group having 1 to 6 carbon atoms);
a substituted or unsubstituted phenoxy or naphthoxy group (which has at least a linear or branched alkyl or alkoxy group having 1 to 6 carbon atoms as a substituent); or a —COR$_9$, —COOR$_9$, or —CONHR$_9$ group (here, R$_9$ is a linear or branched alkyl group having 1 to 6 carbon atoms, a cycloalkyl group having 3 to 6 carbon atoms, or a substituted or unsubstituted phenyl or benzyl group (which has at least one of substituents described above in the definition of R$_1$ and R$_2$ groups as a substituent in a case where each of R$_1$ and R$_2$ groups in the general formula (1) independently corresponds to an aryl or heteroaryl group));

in a case where A exhibits (A$_4$), n is an integer of 0 to 2, and p is an integer of 0 to 4, and in a case where A exhibits (A$_2$), n is an integer of 0 to 2.

3. The composition for optical materials according to claim 1,
   wherein in the polyolefin (A), the content of unit derived from at least one kind of olefin selected from 3-methyl-1-butene, 2-methyl-1-butene, 4-methyl-1-pentene, 3-methyl-1-pentene, and 2-methyl-1-pentene is 50 mol % to 100 mol %.

4. The composition for optical materials according to claim 1,
   wherein the polyolefin (A) is a 4-methyl-1-pentene-based polymer.

5. An optical material comprised of the composition according to claim 1.

6. A plastic eyeglass lens, comprising:
   a substrate comprised of the composition according to claim 1.

7. A film comprised of the composition according to claim 1.

8. A plastic eyeglass lens, comprising:
   a layer comprised of the film according to claim 7 over at least one surface of lens substrate surfaces.

9. A plastic eyeglass lens, comprising:
   lens substrate layers over both surfaces of the film according to claim 7.

* * * * *